United States Patent [19]

Naydowski et al.

[11] Patent Number: 5,605,568
[45] Date of Patent: Feb. 25, 1997

[54] CACO$_3$-TALC COATING PIGMENT SLURRY, PROCESS OF PREPARING THE SAME, AND USE THEREOF

[75] Inventors: Christian Naydowski, Brittnau/AG; Dieter Strauch, Zofingen/AG, both of Switzerland

[73] Assignee: Pluess-Staufer AG, Oftringen, Switzerland

[21] Appl. No.: 227,555

[22] Filed: Apr. 14, 1994

[30] Foreign Application Priority Data

Apr. 16, 1993 [DE] Germany .......................... 43 12 463.1

[51] Int. Cl.$^6$ ....................................................... C09C 1/02
[52] U.S. Cl. ........................................... 106/464; 106/469
[58] Field of Search ...................... 106/469, 464

[56] References Cited

U.S. PATENT DOCUMENTS 5,120,365  6/1992  Kolger .................................. 106/415

FOREIGN PATENT DOCUMENTS 0332102  9/1989  European Pat. Off. .
3312778  11/1983  Germany .

OTHER PUBLICATIONS

Baumeister, M, et al, "Talk/Carbonatmischungen als alternatives Tiefdruckpigment" in: *Wochenblatt Für Papierfabrikation*, No. 17, 1991, pp. 662–665 (no month available).

*Primary Examiner*—Mark L. Bell
*Assistant Examiner*—Scott L. Hertzog
*Attorney, Agent, or Firm*—Townsend and Townsend and Crew LLP

[57] ABSTRACT

A CaCO$_3$-talc coating pigment slurry consists of the following four co-ground components:

a. 24 to 64% by weight CaCo$_3$,
b. 5 to 48% by weight talc,
c. 20 to 40% by weight H$_2$O, and
d. an adjuvant combination consisting of
  0.05 to 1.4% by weight of at least one commercially available grinding acid and
  0.05 to 1.2% by weight of at least one commercially available dispersing agent, wherein the mixed pigments have an average statistical particle diameter of 0.4 μm to 1.5 μm. That coating pigment slurry can be used to special advantage to prepare a composition for coating papers for gravure printing.

35 Claims, No Drawings

CACO₃-TALC COATING PIGMENT SLURRY, PROCESS OF PREPARING THE SAME, AND USE THEREOF

BACKGROUND OF THE INVENTION

1. Field of the Invention

This invention relates to a $CaCO_3$-talc coating pigment slurry, to a process of preparing the same, to its preferred uses, and to a novel adjuvant combination for use in grinding the pigments.

2. Description of the Prior Art

Coated papers are coated with a composition which essentially comprises a binder and a pigment, which consists of a mineral filler. A description of the components of compositions for coating paper and of their use can be found, e.g., in the book by James P. Casey "Pulp and Paper Chemistry and Technology", Chapter XIX, Volume III (1961).

Three different processes are known in the printing art, namely, letterpress printing, offset printing, and gravure printing.

Letterpress printing is a relief printing process. As in a stamp, the printing surface is a raised surface portion of the printing plate. The raised image surface is inked by means of a roller. Coated paper, which contains kaolin or calcium carbonate, may be used in that printing process.

Offset printing is a planographic printing process, in which the printing and non-printing surfaces lie in a plane and are distinguished from each other in that the printing surface portions are adapted to receive and release grease (i.e. printing ink), but repell water, whereas the non-printing surface portions retain water but repell grease (ink). The rotating printing cylinder first contacts the water-carrying damping roller and subsequently the ink-carrying inking roller. But the printing cylinder does not print directly on the paper but on a rubber blanket, which is trained around a cylinder, from which the printed image is transferred to the paper, which is urged by a cylinder against the blanket cylinder. Coating pigments which contain kaolin and calcium carbonate are used in that process.

In gravure printing, the printing portions of the cylinder are disposed below the polished surface. The cylinder is first moved through liquid ink in a trough and subsequently contacts a doctor blade, which is a steel blade, by which surplus ink is scraped off whereas the ink for printing is retained in small cups until the paper is urged by an impression cylinder against the printing cylinder and sucks the ink out of the cups.

Kaolin is predominantly used as a coating pigment in the gravure printing practice. But the use of kaolin as a coating pigment in papers for gravure printing involves a number of disadvantages and particularly has an unsatisfactory rheological behavior. For this reason it is not possible to use coating compositions having a solids content so that the drying of the coating involves high energy costs. Moreover, kaolin-based coating pigments in papers for gravure printing have only very low whiteness values.

It is known in the art to use a so-called "Superclay" as a coating pigment in papers for gravure printing.

The use of talc as a coating pigment has already been investigated. For instance, talc has been used as a filler in papers in Finland since the 1960's. The chemical structure of talc is similar to that of kaolin. Kaolin consists of aluminosilicate platelets. Talc is also a pigment consisting of platelets, but consists of magnesium silicate. Besides, the most significant physical properties of talc do not substantially differ from those of kaolin.

But the use of talc in compositions for coating paper also involves various disadvantages. Owing to its chemical structure, talc is hydrophobic and for this reason the pigment coating can be wetted by dispersions only with difficulty and an effective venting will be required during the application of dispersions. Moreover, the use of talc rather than kaolin in the coating machine will necessitate the use of a novel type of binders and a different mode of operation of the coating machine in order to ensure that the retention of water, the air content and the rheology will not give rise to major problems.

Owing to said disadvantages it has already been attempted to use mixed pigments consisting of kaolin and talc in coating compositions for papers for gravure printing and for web-fed papers for offset printing. (See Tappi Journal, Volume 68, No. 11, pages 92 and 93, November 1985).

From "Wochenblatt für Papierfabrikation", 107, pages 909 to 914 (1979), No. 23/24, it is already known to add 5 to 10% talc to coating compositions containing calcium carbonate for use on papers for offset printing.

From Tappi Journal, Volume 68, No. 11, page 93, November 1985, it is also known to use mixed pigments consisting of 85% talc and 15% calcium carbonate. It is very difficult to grind and process talc alone in the preparation of slurries because the product is highly hydrophobic. For this reason 15% $CaCO_3$ have been added to the talc in the preparation of a slurry having a higher solids content merely in order to improve the processing but without an intention to make improved coating pigment compositions. As regards the properties of papers used for gravure printing such a mixture of 85% talc and 15% $CaCO_3$ will have no advantages over a mixture of talc and kaolin and there is even a risk that the still low solids content of the coating composition ($CaCO_3$ will not have a favorable rheological influence unless it is added in an amount of or above 50%) may decrease the gloss of paper. Severe problems will arise in the processing of such papers owing to the slipperiness of the surfaces coated with such compositions and the sliding properties of said surface.

EP 0 332 102 A2 discloses mixed pigments consisting of 40 to 80% by weight calcium carbonate and/or dolomite and 20 to 60% by weight talc or 20 to 60% by weight of a talc-kaolin mixture or 20 to 60% by weight of a talc-mica mixture. That mixture is prepared in that the several components are mixed. It may be used in the papermaking industry, particularly as a coating composition for papers for gravure printing. That known pigment mixture has particularly the following disadvantages:

Poor dispersibility owing to the hydrophobic nature of talc;

inhomogeneities due to talc agglomerates in the mixed slurry so that irregularities are found in the coating;

from the examples it is apparent that only low solids contents are achieved.

For this reason it has already been proposed to jointly grind calcite and talc. DE 33 12 778 C2 discloses such a process, in which an aqueous suspension containing talc powder and calcite powder is microground by attrition grinding. In that case it is preferred to use a mixture of talc, calcite, and water with a solids content of 50 to 80%. Talc and calcite are preferably used in a mixing ratio from 2:1 to 1:3.

The assignee of the present invention has attempted to use that process although DE 33 12 778 C2 fails to disclose even a single example. It has been found that it is not possible to achieve the required solids content.

For this reason the assignee of the present invention has attempted to use the conventional grinding aids in order to achieve improved results. Such grinding aids are known, e.g., from DE 27 48 243 A1, which relates also to a talc pigment. In accordance with DE 27 48 243 A1 talc is contacted with a surfactant, a polyelectrolyte and a defoamer or with carboxycellulose and a polyelectrolyte and optionally with other additives during or after the granulation of the talc and is slurried in water or in solution of one or more of said substances.

But it has been found that in spite of the use of known grinding aids the process disclosed in DE 33 12 778 C2 had resulted in an end product having a high grey level and very high viscosities were measured immediately after the grinding and it was not possible to ensure an adequate shelf life.

It is finally known from "Wochenblatt fur Papierfabrikation" 1991, No. 17, pages 662 to 665, that mixtures of talc and carbonate may be used to make effectively printable papers for gravure printing if the coating composition is applied by means which permit the coating machines to be operated at a higher velocity and with a low frequency of web breaks.

SUMMARY OF THE INVENTION

For this reason it is an object of the present invention to provide a $CaCO_3$-talc pigment slurry which distinguishes by having a high solids content, a low viscosity and a long shelf life.

That object is accomplished in accordance with the invention in that the slurry consists of the following four co-Ground components:

a. 24 to 64% by weight $CaCO_3$,
b. 5 to 48% by weight talc,
c. 20 to 40% by weight $H_2O$, and
d. an adjuvant combination consisting of
   0.05 to 1.4% by weight of at least one commercially available Grinding aid and
   0.05 to 1.2% by weight of at least one commercially available dispersing agent, and that the mixed pigments have an average statistical particle diameter of 0.4 µm to 1.5 µm.

In the present application all values stated in % by weight apply to bone-dry (B.D.) components.

The mixed pigments have preferably the following particle size distribution:

a. 95 to 100% particles <10 µm,
b. 50 to 95% particles <2 µm,
c. 27 to 75% particles <1 µm,
d. 0.1 to 35% particles <0.2 µm, based on the equivalent diameter of each particle.

The slurry preferably consists of the following four co-ground components:

a. 28 to 61% by weight $CaCO_3$,
b. 10 to 44% by weight talc,
c. 22 to 38% by weight $H_2O$, and
d. an adjuvant combination consisting of
   0.1 to 1.3% by weight of at least one commercially available grinding aid and
   0.1 to 1.0% by weight of at least one commercially available dispersing agent, and that the mixed pigments have an average statistical particle diameter of 0.4 µm to 1.5 µm.

The slurry preferably consists of the following four co-ground components:

a. 33 to 56% by weight $CaCO_3$,
b. 14 to 37% by weight talc,
c. 25 to 36% by weight $H_2O$, and
d. an adjuvant combination consisting of
   0.2 to 1.2% by weight of at least one commercially available grinding aid and
   0.2 to 0.6% by weight of at least one commercially available dispersing agent, and the mixed pigments have an average statistical particle diameter of 0.4 µm to 1.5 µm.

The slurry preferably consists of the following four co-ground components:

a. 39 to 51% by weight $CaCO_3$,
b. 18 to 31% by weight talc,
c. 27 to 33% by weight $H_2O$, and
d. an adjuvant combination consisting of
   0.3 to 0.8% by weight of at least one commercially available grinding aid and
   0.25 to 0.5% by weight of at least one commercially available dispersing agent, and the mixed pigments have an average statistical particle diameter of 0.4 µm to 1.5 µm.

The slurry preferably consists of the following four co-ground components:

a. 44 to 48% by weight $CaCO_3$,
b. 21 to 25% by weight talc,
c. 28.2 to 32.2% by weight water, and
d. an adjuvant combination consisting of
   0.35 to 0.45% by weight of at least one commercially available grinding aid and
   0.35 to 0.45% by weight of at least one commercially available dispersing agent, and the mixed pigments have an average statistical particle diameter of 0.4 µm to 1.5 µm.

The mixed pigments preferably have an average statistical diameter of 0.7–1.3 µm.

The mixed pigments have preferably the following particle size distribution:

a. 96 to 100% particles <10 µm,
b. 60 to 92% particles <2 µm,
c. 35 to 70% particles <1 µm,
d. 3 to 28% particles <0.2 µm, based on the equivalent diameter of each particle.

The mixed pigments preferably have an average statistical particle diameter of 0.8 to 1.1 µm.

The mixed pigments have preferably the following particle size distribution:

a. 98 to 100% particles <10 µm,
b. 68 to 85% particles <2 µm,
c. 42 to 62% particles <1 µm,
d. 9 to 22% particles <0.2 µm, based on the equivalent diameter of each particle.

The mixed pigments have preferably an average statistical diameter of 0.9 µm.

The mixed pigments have preferably the following particle size distribution:

a. 99% particles <10 µm,
b. 78% particles <2 µm,
c. 53% particles <1 µm,
d. 28% particles <0.2 µm, based on the equivalent diameter of each particle.

The grinding aid is preferably a water-soluble polymer or copolymer which contains acid groups selected from carboxyl groups and/or sulfonic acid groups or any of their water soluble salts.

The grinding aid preferably consists of the polymers and/or copolymers of acrylic acids.

The grinding aid is preferably constituted by the acrylic acid polymers and/or copolymers thereof which are completely neutralized by a) at least one neutralizing agent having a monovalent function and b) at least one neutralizing agent having a polyvalent function or an amine.

The grinding aid preferably consists of that fraction of the completely neutralized acrylic acid polymers and/or copolymers which has a specific viscosity between 0.3 and 0.8.

The grinding aid is preferably a polymer or copolymer of at least one of the monomers and/or comonomers of the group consisting of acrylic, methacrylic, itaconic, crotonic and fumaric acids and maleic anhydride.

The grinding aid is preferably a Ca-Na salt of a polyacrylic acid.

Other grinding aids which can be used for the purposes of the invention are disclosed in European Patent Specification 0 100 947, the disclosure of which is incorporated herein by reference.

The dispersing agent is preferably a water-soluble polymer or copolymer which contains acid groups selected from carboxylic groups and/or sulfonic acid groups or of any of their water-soluble salts.

The dispersing agent preferably consists of the polymers and/or copolymers of acrylic acid.

The dispersing agent is preferably a potassium salt of a polyacrylic acid.

The dispersing agent is preferably a potassium salt of a copolymer of acrylic acid and butylacrylic acid.

To prepare the slurry in accordance with the invention, the precomminuted $CaCO_3$ and the precomminuted talc are subjected to wet co-grinding in an aqueous suspension which contains the adjuvant combination.

All characteristics stated in this patent application which relate to the particle fineness of the products prepared in accordance with the invention were determined by a sedimentation analysis in the gravitational field by a SEDIGRAPH 5100 instrument available from Micromeritics in the United States. That instrument is known to those having ordinary skill in the art and is used throughout the world to determine the fineness of fillers and pigments. The measurement was effected in an aqueous solution of 0.1% by weight $Na_4P_2O_7$. The samples were dispersed by means of a high-speed stirrer and ultrasonic waves.

The measured particle size distribution is represented in an X-Y plot by a cumulative underflow particle size distribution curve (permeation summation curve) (see, e.g., Belger, P., Schweizerische Vereinigung der Lack- und Farben-Chemiker, XVII. FATIPEC-Kongress, Lugano, Sept. 23 to 28, 1984), where the equivalent diameter in accordance with DIN 66 160, page 3, is plotted on the X axis and the content of the particles in % by weight is plotted on the Y axis.

The fineness properties defined hereinbefore were read or calculated from the curves obtained by the methods described hereinbefore.

In connection with the foregoing definitions, reference is also made to Belger, P., Schweizerische Vereinigung der Lack-und Farben-Chemiker, XVII. FATIPEC-Kongress, Lugano, Sept. 23 to 28, 1984.

Those having ordinary skill in the art are aware that for a measurement of the particle size distribution by sedimentation analysis the density of the particles must be known. The invention is concerned with co-ground mixed pigments consisting of particles of calcium carbonate and talc. The particles of both kinds can be assumed to have a mean density of 2.7 $g/cm^3$.

All viscosity values stated in this patent application for the products prepared in accordance with the invention were determined with the BROOKFIELD viscosimeter RVTDV-II+ of BROOKFIELD, U.S.A. That instrument is known to those having ordinary skill in the art and is used throughout the world to determine the viscosity of liquids and slurries. The measurements were taken with the No. 3 measuring spindle at a speed of 100 r.p.m. and a slurry temperature of 22°±2° C.

Further features and advantages of the invention will become apparent from the following description of examples, comparative examples and examples of use. All percentages are stated in percent by weight.

DETAILED DESCRIPTION OF THE PREFERRED EMBODIMENTS

EXAMPLE

Before the co-grinding the natural calcium carbonate was first ground under dry and/or wet conditions in a manner known per se and was subsequently subjected to particle size classification by air separation and/or by a hydrocyclone.

The thus comminuted calcium carbonate had the following particle size distribution:

99% <20 μm

82% <10 μm

24% <2 μm

13% <1 μm

Before the co-grinding the talc was ground under dry and/or wet conditions and was then subjected to particle size classification by air separation and/or by a hydrocyclone.

The thus comminuted talc had the following particle size distribution:

86% <20 μm

53% <10 μm

9% <2 μm

6% <1 μm

For the co-grinding, the components used for the purposes of the invention were mixed in the following proportions:

46.7% natural $CaCO_3$, 23.3% talc, 29.2% water, 0.8% adjuvant combination consisting of 0.4% grinding aid consisting of a Na-Ca salt of a polyacrylic acid and 0.4% dispersing agent consisting of a K salt of a copolymer of acrylate and butylacrylate.

Co-grinding was carried out in an agitating ball mill to prepare a $CaCO_3$-talc coating pigment slurry having the following particle size distribution:

99% <10 μm

74% <2 μm

49% <1 μm

12% <0.2 μm

That particle size distribution corresponds to an average statistical particle diameter of 1.1 μm.

The product has the following further properties: Elrepho R 457 whiteness: 90%

| | |
|---|---|
| Solids content of slurry: | 69% |
| Viscosity (when the slurry had been stirred for 15 min.) | 200 mPa s |

The shelf life of the slurry is expressed by the viscosity it assumes when it is not stirred:

Viscosity (after 14 days without stirring): 400 mPa s

That value corresponds to a surprisingly long shelf life of the slurry.

Illustrative Uses and Comparative Examples

In the manner described hereinbefore a slurry product was prepared and was tested in comparison with coating pigment slurries known in the art for use in compositions for coating papers.

| | |
|---|---|
| First coating pigment (No. 1): (according to the prior art) | Superclay (kaolin) |
| Second coating pigment (No. 2): (according to the prior art) | HYDROCARB 90-MD (natural CaCO$_3$) |
| Third coating pigment (No. 3): (in accordance with the invention) | CaCO$_3$-talc coating pigment slurry) |

Together with the first coating pigment the following components were used per 100 WP Superclay to prepare a coating pigment composition:

| | |
|---|---|
| Binder (acrylic ester-containing copolymer, self-thickening | 5.0 WP B.D. |
| dispersing agent (sodium polyacrylate) (Na-polyacrylate) | 0.3 WP B.D. |
| calcium stearate | 0.8 WP B.D. |

(WP = parts by weight, B.D. = bone-dry)

The coating pigment composition was adjusted to a solids content of 54.5%.

Together with the second coating pigment the following components were used per 100 WP pigment to prepare a coating pigment composition:

| | |
|---|---|
| Binder (acrylic ester-containing copolymer self-thickening) | 5.0 WP B.D. |
| calcium stearate | 0.8 WP B.D. |

The coating pigment composition was adjusted to a solids content of 64.5%.

The coating pigment composition containing the third coating pigment was formulated like the composition containing the second coating pigment. The coating pigment composition was adjusted to a solids content of 59.8%.

It is apparent from the following Table I that the pigment slurry in accordance with the invention could be adjusted to a high solids content of 59.8% although it was processed at a much lower viscosity than a slurry which contained kaolin, which is the typical coating pigment in the prior art.

TABLE I

| | Superclay | Hydrocarb 90 | Mixed pigments in accordance with the invention |
|---|---|---|---|
| Solids content of coating pigment composition (%) | 54.5 | 64.5 | 59.8 |
| Viscosity in mPa s at 20 r.p.m | 8,900 | 6,400 | 3,790 |

Coating conditions for an LWC paper for gravure printing:

| | |
|---|---|
| Raw paper to be coated: | 36 g/m$^2$, wood-containing |
| Coating: | upper side (US): 9 g/m$^2$ wire side (WS) 10 g/m$^2$ |
| Coating machine: | Laboratory blade coates at 20 m/min. |
| Drying: | IR dryer |
| Glazing: | Laboratory two-roll calender 3 passes per side Line pressure 900 N/cm Roll temperature 90° C. |
| Tested properties: | |
| Gloss: | In accordance with Tappi at angles of incidence and reflection of 75° |
| Roughness: | With the Parker Printer Surf PPS 78 |
| Printability: | Heliotest (20 missing dots, 40 kp, mm) |
| Opacity: | Differential measurement in |
| Smoothness: | Bekk secondary smoothness |
| Whiteness: | Whiteness R-457 + UV |
| Test Results: | |

TABLE 2

| | Coating Pigment No. | | |
|---|---|---|---|
| | 1 | 2 | 3 |
| Opacity (%) | 89.0 | 86.6 | 88.9 |
| Roughness (μm) | 1.8/1.5 | 1.9/1.8 | 1.6/1.5 |
| Smoothness (Bekk secondary smoothness) | 2990/2150 | 2235/1515 | 3360/2105 |
| Printability (mm) | 67/42 | 14/10 | 94/66 |
| Whiteness (%) | 72.3/73.1 | 76.7/77.9 | 75.9/76.6 |
| Paper gloss (%) | 45/48 | 42/43 | 42/40 |

The results of the measurements indicate particularly good properties for the coating pigment in accordance with the invention, particularly as regards the surprisingly good printability, which is the most important property of a pigment for gravure printing. But advantages compared to kaolin used in the prior art are afforded also as regards the whiteness, roughness and smoothness. The opacity is comparable and the gloss of the paper is slightly lower.

The CaCO$_3$-talc coating pigment slurry in accordance with the invention can be used to special advantage in the papermaking industry, particularly to prepare a composition for coating paper and to special advantage to prepare a composition for coating papers for gravure printing.

The product in accordance with the invention can be used with excellent results to prepare a composition for coating lightweight papers (LWC papers) for gravure printing even when the coating composition is applied at a high speed (up to 1500 r.p.m.).

The product in accordance with the invention can also be used with good results to make reel paper for offset printing and particularly for making lightweight coated reel paper (LWC reel paper) for offset printing.

The invention affords particularly the following advantages:

High solids content;

Low viscosity and long shelf life of the slurry;

Excellent printability of papers for gravure printing inconjunction with a higher whiteness, higher smoothness, and lower roughness of the papers.

we claim:

1. A $CaCO_3$-talc coating pigment slurry consisting of the following four co-ground components:
   a. 24 to 64% by weight $CaCO_3$,
   5 to 48% by weight talc,
   20 to 40% by weight $H_2O$, and
   an adjuvant combination consisting of:
   0.05 to 1.4% by weight of at least one commercially available grinding aid, and
   0.05 to 1.2% by weight of at least one commercially available dispersing agent;
   wherein the talc and the $CaCO_3$ have an average statistical particle diameter of 0.7 μm to 1.3 μm.

2. A $CaCO_3$-talc coating pigment slurry according to claim 1, characterized in that the mixed pigments have the following particle size distribution:
   a. 95 to 100% particles <10 μm,
   b. 50 to 95% particles <2 μm,
   c. 27 to 75% particles <1 μm,
   d. 0.1 to 35% particles <0.2 μm,
   based on the equivalent diameter of each particle.

3. A $CaCO_3$-talc coating pigment slurry according to claim 1 characterized in that it consists of the following four co-ground components:
   a. 28 to 61% by weight $CaCO_3$,
   b. 10 to 44% by weight talc,
   c. 22 to 38% by weight $H_2O$, and
   d. an adjuvant combination consisting of
   0.1 to 1.3% by weight of at least one commercially available grinding aid and
   0.1 to 1.0% by weight of at least one commercially available dispersing agent,
   and that the mixed pigments have an average statistical particle diameter of 0.4 μm to 1.5 μm.

4. A $CaCO_3$-talc coating pigment slurry according to claim 1 wherein the slurry consists of the following four co-ground components:
   a. 33 to 56% by weight $CaCO_3$,
   b. 14 to 37% by weight talc,
   c. 25 to 36% by weight $H_2O$, and
   d. an adjuvant combination consisting of;
   0.2 to 1.2% by weight of at least one commercially available grinding aid, and
   0.2 to 0.6% by weight of at least one commercially available dispersing agent; wherein the $CaCO_3$ and the talc have an average statistical particle diameter of 0.7 μm to 1.3 μm.

5. A $CaCO_3$-talc coating pigment slurry according to claim 1 wherein the slurry consists of the following four co-ground components:
   a. 39 to 51% by weight $CaCO_3$,
   b. 18 to 31% by weight talc,
   c. 27 to 33% by weight $H_2O$, and
   d. an adjuvant combination consisting of:
   0.3 to 0.8% by weight of at least one commercially available grinding aid, and
   0.25 to 0.5% by weight of at least one commercially available dispersing agent
   wherein the $CaCO_3$ and the talc have an average statistical particle diameter of 0.7 μm to 1.3 μm.

6. A $CaCO_3$-talc coating pigment slurry according to claim 1 wherein the slurry consists of the following four co-ground components:
   a. 44 to 48% by weight $CaCO_3$,
   b. 21 to 25% by weight talc,
   c. 28.2 to 32.2% by weight water, and
   d. an adjuvant combination consisting of:
   0.35 to 0.45% by weight of at least one commercially available grinding aid, and
   0.35 to 0.45% by weight of at least one commercially available dispersing agent;
   wherein the $CaCO_3$ and the talc have an average statistical particle diameter of 0.7 μm to 1.3 μm.

7. A $CaCO_3$-talc coating pigment slurry according to claim 1 characterized in that the mixed pigments have the following particle size distribution:
   a. 96 to 100% particles <10 μm,
   b. 60 to 92% particles <2 μm,
   c. 35 to 70% particles <1 μm,
   d. 3 to 28% by weight particles <0.2 μm based on the equivalent diameter of each particle.

8. A $CaCO_3$-talc coating pigment slurry according to claim 1 characterized in that the mixed pigments have an average statistical particle diameter of 0.8 to 1.1 μm.

9. A $CaCO_3$-talc coating pigment slurry according to claim 1 characterized in that the mixed pigments have the following particle size distribution:
   a. 98 to 100% particles <10 μm,
   b. 68 to 85% particles <2 μm,
   c. 43 to 62% particles <1 μm,
   d. 9 to 22% by weight particles <0.2 μm based on the equivalent diameter of each particle.

10. A $CaCO_3$-talc coating pigment slurry according to claim 1 characterized in that the mixed pigments have an average statistical particle diameter of 0.9 μm.

11. A $CaCO_3$-talc coating pigment slurry according to claim 1 characterized in that the mixed pigments have the following particle size distribution:
    a. 99% particles <10 μm,
    b. 78% particles <2 μm,
    c. 53% particles <1 μm,
    d. 28% by weight particles <0.2 μm, based on the equivalent diameter of each particle.

12. A $CaCO_3$-talc coating pigment slurry according to claim 1 characterized in that the grinding aid is a water-soluble polymer or copolymer which contains acid groups selected from carboxyl groups and/or sulfonic acid groups or one of their water-soluble salts.

13. A $CaCO_3$-talc coating pigment slurry according to claim 1 characterized in that the grinding aid consists of the polymers and/or copolymers of acrylic acids.

14. A $CaCO_3$-talc coating pigment slurry according to claim 1 characterized in that the grinding aid is constituted by the acrylic acid polymers and/or copolymers which are completely neutralized by a) at least one neutralizing agent having a monovalent function and b) at least one neutralizing agent having a polyvalent function or an amine.

15. A $CaCO_3$-talc coating pigment slurry according to claim 1 characterized in that the grinding aid consists of that fraction of the completely neutralized acrylic acid polymers and/or copolymers which has a specific viscosity between 0.3 and 0.8.

16. A $CaCO_3$-talc coating pigment slurry according to claim 1 characterized in that the grinding aid is a polymer or copolymer of at least one of the monomers and/or comonomers of the group consisting of the acrylic, methacrylic, itaconic, crotonic, and fumaric acids and maleic anhydride.

17. A $CaCO_3$-talc coating pigment slurry according to claim 1 characterized in that the grinding aid is a Na-Ca salt of a polyacrylic acid.

18. A $CaCO_3$-talc coating pigment slurry according to claim 1 characterized in that the dispersing agent is a water-soluble polymer or copolymer which contains acid groups selected from carboxyl groups and/or sulfonic acid groups or one of their water-soluble salts.

19. A $CaCO_3$-talc coating pigment slurry according to claim 1 characterized in that the dispersing agent consists of the polymers and/or copolymers of acrylic acid.

20. A $CaCO_3$-talc coating pigment slurry according to claim 1 characterized in that the dispersing agent is a potassium salt of a polyacrylic acid.

21. A $CaCO_3$-talc coating pigment slurry according to claim 1 characterized in that the dispersing agent is a potassium salt of a copolymer of acrylic acid and butylacrylic acid.

22. A process of preparing a $CaCO_3$-talc coating pigment slurry comprising the steps of:
   (a) mixing the following components together:
      i. 24 to 64% by weight $CaCO_3$,
      ii. 5 to 48% by weight talc,
      iii. 20 to 40% by weight $H_2O$, and
      iv. an adjuvant combination consisting of:
         0.05 to 1.4% by weight of at least one commercially available grinding aid, and
         0.05 to 1.2% by weight of at least one commercially available dispersing agent; and
   (b) wet grinding the components in an aqueous solution;
   wherein the $CaCO_3$ and the talc have an average statistical diameter of 0.7 μm to 1.3 μm.

23. A $CaCO_3$-talc coating pigment slurry consisting of the following four co-ground components:
   a. 24 to 64% by weight $CaCO_3$,
   b. 5 to 48% by weight talc,
   c. 20 to 40% by weight $H_2O$, and
   d. an adjuvant combination consisting of:
      0.05 to 1.4% by weight of at least one commercially available grinding aid, selected from the group of acrylic acid polymers and/or copolymers which are completely neutralized by a) at least one neutralizing agent having a monovalent function and/or) at least one neutralizing agent having a polyvalent function or an amine, whereby the grinding aid consists of that fraction of the completely neutralized acrylic acid polymers and/or copolymers which has a specific viscosity between 0.3 and 0.8; and
      0.05 to 1.2% by weight of at least one commercially available dispersing agent, consisting of the polymers and/or copolymers of acrylic acid;
   wherein the $CaCO_3$ and the talc have an average statistical particle diameter of 0.8 μm to 1.1 μm.

24. A $CaCO_3$-talc coating pigment slurry according to claim 23 the $CaCO_3$ and the talc each have the following particle size distribution:
   a. 95 to 100% particles <10 μm,
   b. 50 to 95% particles <2 μm,
   c. 27 to 75% particles <1 μm,
   d. 0.1 to 35% particles <0.2 μm,
based on the equivalent diameter of each particle.

25. A $CaCO_3$-talc coating pigment slurry according to claim 23 consisting of the following four co-ground components:
   a. 28 to 61% by weight $CaCO_3$,
   b. 10 to 44% by weight talc,
   c. 22 to 38% by weight $H_2O$, and
   d. an adjuvant combination consisting of
      0.1 to 1.3% by weight of at least one commercially available grinding aid, and
      0.1 to 1.0% by weight of at least one commercially available dispersing agent,
   wherein the $CaCO_3$ and the talc have an average statistical particle diameter of 0.8 μm to 1.1 μm.

26. A $CaCO_3$-talc coating pigment slurry according to claim 23 consisting of the following four co-ground components:
   a. 33 to 56% by weight $CaCO_3$,
   b. 14 to 37% by weight talc,
   25 to 36% by weight $H_2O$, and
   d. an adjuvant combination consisting of:
      0.2 to 1.2% by weight of at least one commercially available grinding aid, and
      0.2 to 0.6% by weight of at least one commercially available dispersing agent;
   wherein the $CaCO_3$ and the talc have an average statistical particle diameter of 0.8 μm to 1.1 μm.

27. A $CaCO_3$-talc coating pigment slurry according to claim 23 consisting of the following four co-ground components:
   a. 39 to 51% by weight $CaCO_3$,
   b. 18 to 31% by weight talc,
   c. 27 to 33% by weight $H_2O$, and
   d. an adjuvant combination consisting of:
      0.3 to 0.8% by weight of at least one commercially available grinding aid, and
      0.25 to 0.5% by weight of at least one commercially available dispersing agent;
   wherein the $CaCO_3$ and the talc have an average statistical particle diameter of 0.8 μm to 1.1 μm.

28. A $CaCO_3$-talc coating pigment slurry according to claim 23 consisting of the following four co-ground components:
   a. 44 to 48% by weight $CaCO_3$,
   b. 21 to 25% by weight talc,
   c. 28.2 to 32.2% by weight water, and
   d. an adjuvant combination consisting of:
      0.35 to 0.45 by weight of at least one commercially available grinding aid, and
      0.35 to 0.45 by weight of at least one commercially available dispersing agent;
   wherein the $CaCO_3$ and the talc have an average statistical particle diameter of 0.8 μm to 1.1 μm.

29. A $CaCO_3$-talc coating pigment slurry according to claim 23 wherein the $CaCO_3$ and the talc each have the following particle size distribution:
   a. 96 to 100% particles <10 μm,
   b. 60 to 92% particles <2 μm,
   c. 35 to 70 particles <1 μm,
   d. 3 to 28% by weight particles <0.2 μm
based on the equivalent diameter of each particle.

30. A $CaCO_3$-talc coating pigment slurry according to claim 23 wherein the $CaCO_3$ and the talc have the following particle size distribution:
   a. 98 to 100% particles <10 μm,
   b. 68 to 85% particles <2 μm, c. 43 to 62% particles <1 μm, d. 9 to 22% by weight particles <0.2 μm based on the equivalent diameter of each particle.

31. A $CaCO_3$-talc coating pigment slurry according to claim 23 wherein the $CaCO_3$ and the talc have an average statistical particle diameter of 0.9 μm.

32. A $CaCO_3$-talc coating pigment slurry according to claim 23 wherein the $CaCO_3$ and the talc have the following particle size distribution:

a. 99% particles <10 μm, b. 78% particles <2 μm, c. 53% particles <1 μm, d. 28% by weight particles <0.2 μm, based on the equivalent diameter of each particle.

33. A $CaCO_3$-talc coating pigment slurry according to claim 23 wherein the grinding aid is a Na-Ca salt of a polyacrylic acid.

34. A $CaCO_3$-talc coating pigment slurry according claim 23 wherein the dispersing agent is a potassium salt of a polyacrylic acid.

35. A $CaCO_3$-talc coating pigment slurry according to claim 23 wherein the dispersing agent is a potassium salt of a copolymer of acrylic acid and butylacrylic acid.

\* \* \* \* \*